Jan. 25, 1955  H. I. BENSON  2,700,179
APPARATUS FOR APPLYING AND REMOVING SUPPORTING FRAMES
Filed March 20, 1950  3 Sheets-Sheet 1

INVENTOR.
Homer I. Benson
BY
ATTORNEY.

Jan. 25, 1955  H. I. BENSON  2,700,179
APPARATUS FOR APPLYING AND REMOVING SUPPORTING FRAMES
Filed March 20, 1950  3 Sheets-Sheet 2
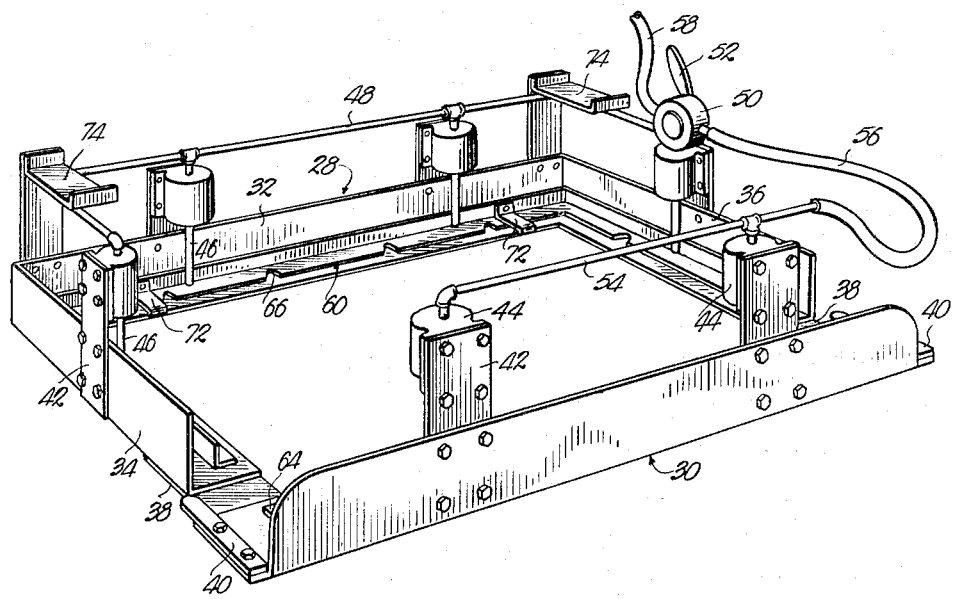
*Fig. 4.*
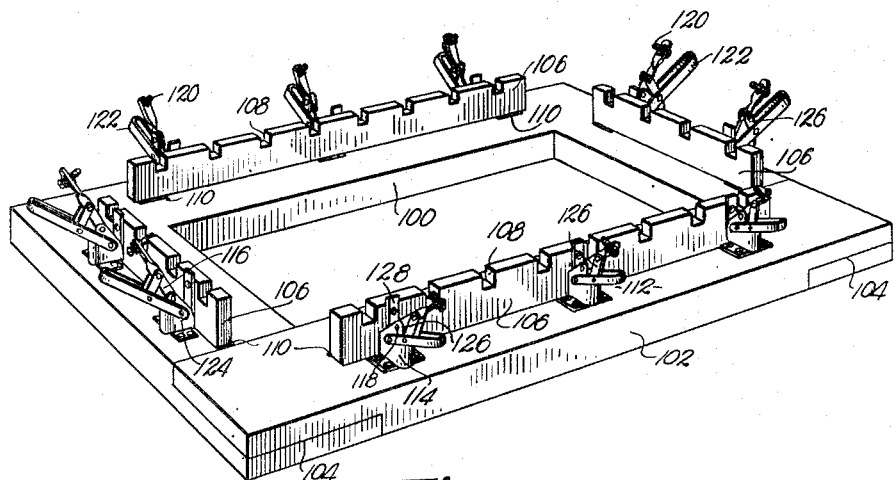
*Fig. 5.*
INVENTOR.
Homer I. Benson
BY
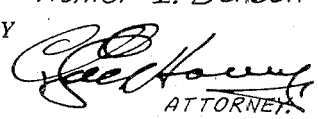
ATTORNEY.

Jan. 25, 1955
H. I. BENSON
2,700,179
APPARATUS FOR APPLYING AND REMOVING SUPPORTING FRAMES
Filed March 20, 1950
3 Sheets-Sheet 3
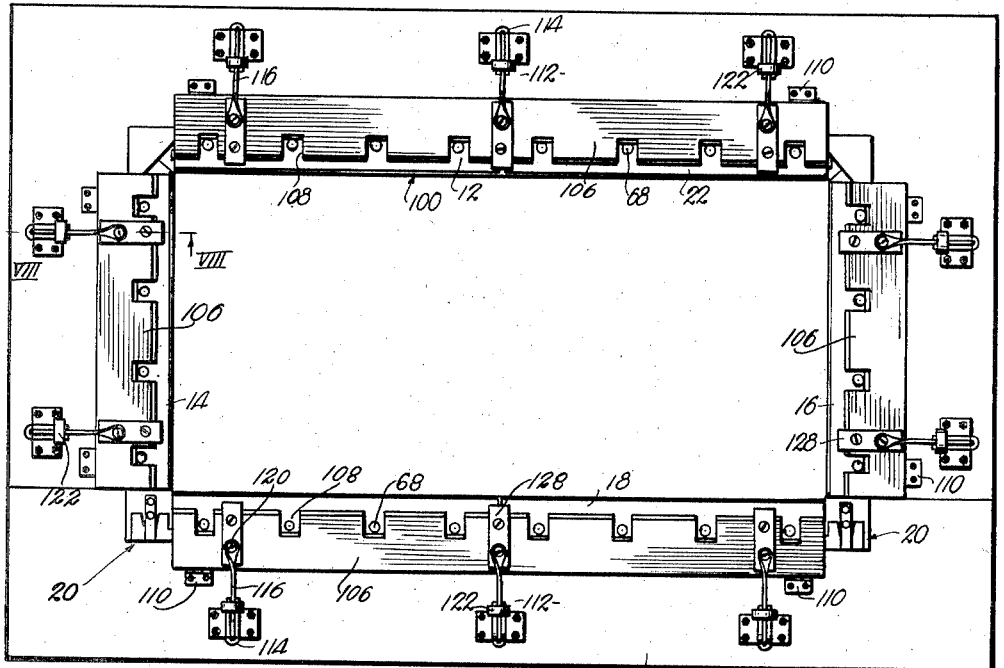
Fig. 6.
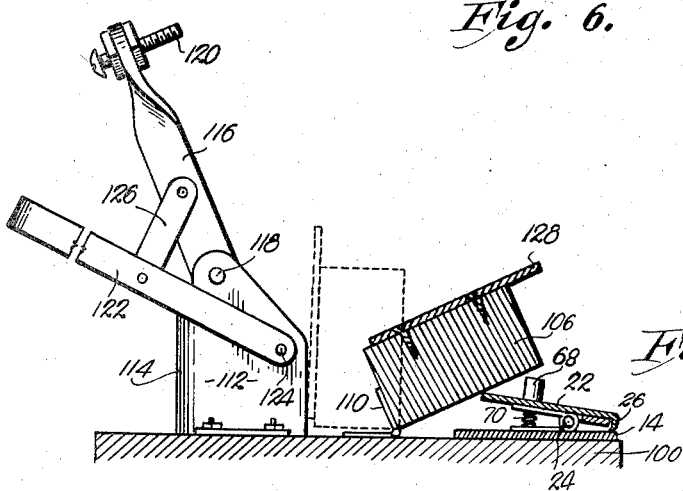
Fig. 7.
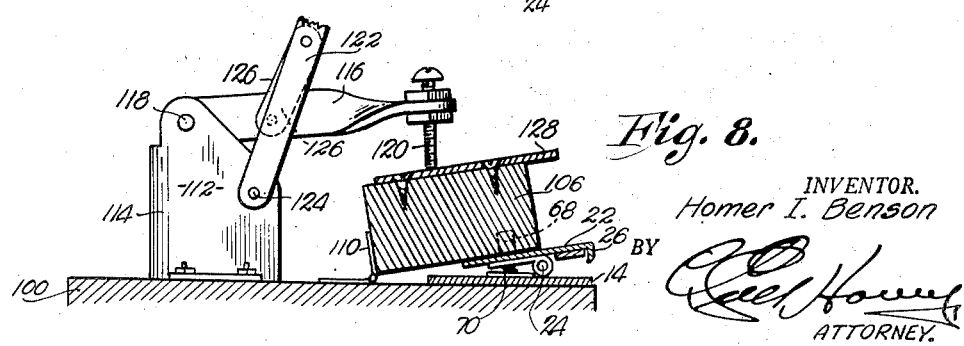
Fig. 8.
INVENTOR.
Homer I. Benson
BY
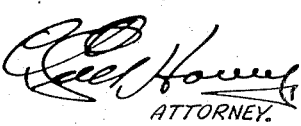
ATTORNEY.

United States Patent Office 2,700,179
Patented Jan. 25, 1955

2,700,179

APPARATUS FOR APPLYING AND REMOVING SUPPORTING FRAMES

Homer I. Benson, Kansas City, Mo., assignor to Regal Plastic Company, Kansas City, Mo., a corporation of Missouri Application March 20, 1950, Serial No. 150,590

4 Claims. (Cl. 18—35)

This invention relates broadly to the field of manufacturing and particularly to apparatus for facilitating the rapid production of molded articles from initially flat sheets of material, particularly those that are thermoplastic in nature and require careful handling because of peculiar shrinking and stretching characteristics thereof as a result of the heating step in the course of the molding operations.

In my co-pending application, filed under even date herewith and entitled "Frame Support for Moldable Sheet Patterns," there is disclosed and described the problems involved through handling of materials such as thermoplastics presently on the market and characterized by their behavior from the standpoint of irregular shrinking and stretching during the heating thereof. In said co-pending application, a novel frame is provided for supporting and holding the sheet of material from which molded articles are produced, while the sheet material is heated and molded. The present invention on the other hand, contemplates apparatus for in turn handling such frame and quickly and easily releasing the gripping elements of the latter so as to permit insertion of the raw sheet material into the holding frame and removal of the molded product at the completion of the heating and molding operations.

It is the primary object of the present invention to provide apparatus of the aforementioned character that includes structure adapted to receive and support a frame having releasable elements thereon that grip sheet material, together with shiftable members movable to and from a position to release all of the elements of the frame and thereby permit removal of the finished product and insertion of an additional sheet of raw material.

The most important object of the present invention is to provide handling apparatus for frames as above set forth that includes a pair of releasable segments, each of which is provided with a number of actuating members capable of not only releasing the elements of the supporting frame but of holding the sections of such frame connected with the segments of the structure thereof while the operator manually replaces new sheets of stock material.

Other objects of the present invention include the way in which the segments of the supporting structure are releasably interconnected; the particular form of the releasing instrumentalities that serve the dual function of simultaneously disengaging a plurality of gripping elements and locking the same with the sectional frame; and many additional more minor objects including details of construction, all of which will be made clear as the following specification progresses.

In the drawing:

Fig. 4 is a stretched-out perspective view of the apparatus per se.

Fig. 5 is a top perspective view of a modified form of apparatus made in accordance with my present invention.

Fig. 6 is a top plan view of the apparatus shown in Fig. 5 and illustrating a supporting frame operably mounted thereon.

Fig. 7 is an enlarged, cross-sectional view through the apparatus shown in Fig. 6 and the supporting frame thereon illustrating one of the manually operable clamps thereof; and Fig. 8 is a cross-sectional view similar to Fig. 7 taken on line VIII—VIII of Fig. 6 and showing one of the clamping elements in an operable condition.

Figure 1:
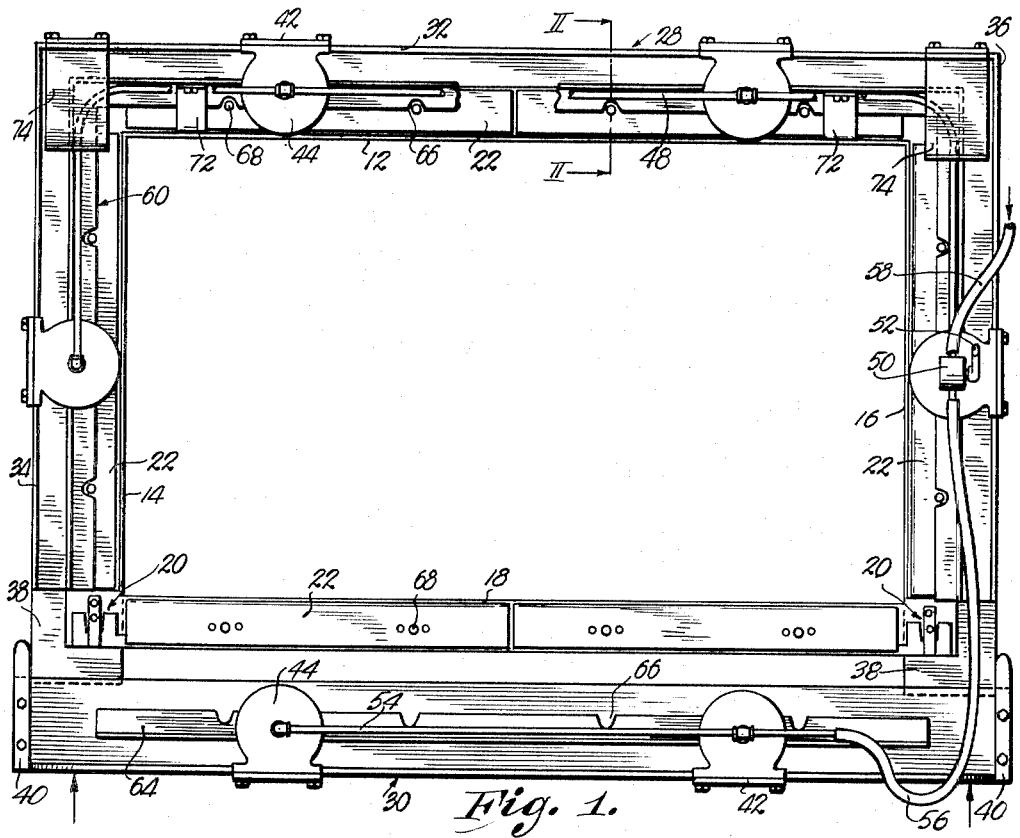
Figure 1 is a top plan view of apparatus made in accordance with the present invention for applying and removing supporting frames and showing the supporting frame itself operably mounted upon the apparatus.

While the supporting frame for raw sheet material 10 (Fig. 3) forms no part of the present invention and, as above mentioned, is fully disclosed in my co-pending application, such frame is illustrated in Figs. 1 and 6 of the drawings hereof, as well as in more detail by Figs. 2, 3, 7 and 8. Briefly, such sheet-supporting frame is sectional, one section being U-shaped and including a bight 12, and interconnected legs 14 and 16. The other section of the frame constitutes an elongated bar 18 similar to bight 12 disposed between the free ends of the legs 14 and 16, and releasably interconnected therewith through interlocks 20. The bight 12, legs 14 and 16, and bar 18 are each provided with an elongated gripping assembly which includes a panel 22 that is swingably secured to the corresponding frame section by means of a spring-loaded hinge 24.

A number of teeth 26 are formed along the innermost longitudinal edge of each panel 22 for contact with the uppermost marginal edge of the sheet material 10 to hold the latter tightly against the uppermost face of the bight 12, legs 14 and 16 and bar 18. In order to place the sheet 10 of raw material upon the supporting framework therefor, it is necessary to swing all of the panels 22 to a position where the teeth 26 provide clearance for receiving the marginal edges of sheet 10. Furthermore, it is necessary that the elongated bar 18 with its panel 22 thereon, be removed from the corresponding interlocking connection 20 while the sheet material 10 is moved into place with respect to the U-shaped frame section including bight 12 and legs 14 and 16.

After the sheet material 10 has been heated in a suitable furnace by placing the entire supporting frame therefor and sheet 10 in the furnace, the frame and heated material 10 are placed in a conventional press to carry out the molding step. During molding, the sheet 10 is forced downwardly into a depending molded article (not shown) and the finished product, still within its supporting frame, must thereupon be released. This releasing operation manifestly includes the disengagement of all of the teeth 26, disassembly of the bar 18 from legs 14 and 16 and, finally, removal of the finished molded product from the sheet-supporting frame.

This invention contemplates apparatus or structure for facilitating the application of sheet material 10 on its supporting frame and the removal of the finished molded product, one form of the structure being illustrated in Figs. 1 to 4 inclusive. This form of the present invention includes a supporting structure having a pair of segments 28 and 30 respectively, the segment 28 being U-shaped and constituting a bight 32 and a pair of legs 34 and 36 joined with bight 32 and disposed in substantial parallelism.

The bight 32, and the legs 34 and 36 are all L-shaped in cross-section as is the elongated segment 30 that is substantially coextensive in length with bight 32. The horizontal portions of the legs 34 and 36 are each provided at the outermost free ends thereof with an underlying plate 38 that extends outwardly beyond the corresponding legs 34 and 36 for receiving the segment 30 in resting relationship thereupon. The horizontal portion of segment 30 is slightly longer than the distance between the legs 34 and 36 and is provided at each end thereof with an elongated guide 40 that overlaps the outermost face of legs 34 and 36 when the segment 30 is in place upon the plates 38.

Each of the segments 28 and 30 has a plurality of upstanding standards 42 rigidly secured thereto for supporting an hydraulic or pneumatic cylinder 44 having a reciprocable piston (not shown) therewithin and connected with a depending stem 46.

The cylinders 44 on segment 28 are all operably interconnected by a fluid pipe 48 that in turn communicates with a valve box 50 having a manual control handle 52.

The cylinders 44 on segment 30 are likewise joined by a fluid pipe 54 and pipe 54 has interconnection with box 50 by means of a flexible hose 56. Air or liquid is directed to the box 50 from any suitable source (not shown) through utilization of a conduit 58.

A U-shaped, secondary structure, broadly designated by the numeral 60, is reciprocably disposed within the segment 28 in overlying relation to the horizontal portions thereof, the secondary structure 60 being L-shaped in cross-section. The upstanding portions of secondary structure 60 are secured directly to all of the stems 46 of segment 28 by means of screws or the like 62, as shown in Figs. 2 and 3.

Stems 46 on segment 30 connect in a similar manner with an elongated bar 64 that is also L-shaped in cross-section. It is noted that the horizontal portions of the secondary structure 60 and bar 64 are each provided with a plurality of notches 66 to clear cylindrical housings 68 that receive one end of the springs 70 for hinges 24.

A pair of L-shaped arms 72 extend outwardly from the bight of secondary structure 60 beyond the innermost longitudinal edge of the horizontal portions thereof. A pair of spaced-apart shelves 74 are secured to the bight 32 of segment 28 and extend upwardly and inwardly therefrom in overlying relationship to the pipe 48.

Figure 2:
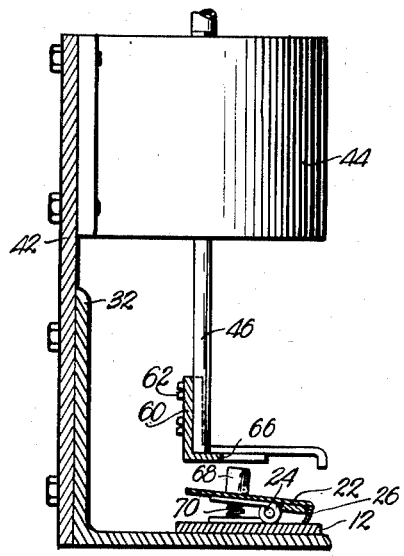
Fig. 2 is an enlarged, transverse, cross-sectional view taken on line II—II of Fig. 1.
Figure 3:
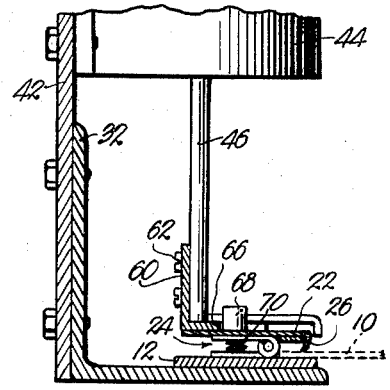
Fig. 3 is a sectional view similar to Fig. 2 showing one of the releasing elements in an operating condition.

When the framework for supporting sheet 10 is placed within the apparatus of Figs. 1 to 4 inclusive, handle 52 is moved to a position to retract all of the stems 46 and to hold the secondary structure 60 and bar 64 in the raised position with respect to the horizontal portions of segment 28. Segment 30 is removed from segment 28 and placed upon the shelves 74, flexible hose 56 permitting such manual movement of segment 30. The sheet supporting frame, including bight 12, and legs 14 and 16, is then moved into place upon the horizontal portions of segment 28 beneath the secondary structure 60 as illustrated in Fig. 2 of the drawings. Handle 52 is thereupon manipulated to hydraulically force all of the stems 46 downwardly to move the secondary structure 60 and bar 64 against all of the panels 22, thereby swinging the latter against the action of springs 70 as illustrated in Fig. 3, to open the teeth 26 and permit insertion of sheet 10. The operator thereupon removes the segment 30, together with bar 18 thereon, from the shelves 74 and places the same upon the plates 38 whereby to temporarily interconnect segments 28 and 30. As the segment 30 is moved in the direction indicated by arrows in Fig. 1, the interlock 20 causes an interconnection between bar 18 and the legs 14 and 16 respectively. All of the teeth 26 of panels 22 upon bight 12, legs 14 and 16 and bar 18 are then disposed in overlying relationship with the corresponding marginal edges of sheet 10. The operator thereupon manipulates handle 52 to cause upward movement of all of the stems 46 to return the same to the position illustrated in Fig. 2 whereby teeth 26 move into engaging relationship with the sheet 10 under the influence of the plurality of springs 70. Segment 30 is thereupon moved from the plates 38, leaving the bar 18 in place and interlocked with the sheet 10 as well as with the legs 14 and 16. Segment 30 is replaced upon the shelves 74 and sheet 10, together with its supporting frame, is removed and placed in the furnace for heating sheet 10 as above described.

After sheet 10 has been heated and molded, its supporting frame is thereupon again placed within the segment 28 and the segment 30 is removed from shelves 74 and replaced upon plates 38. Stems 46 are caused to move downwardly where the secondary structure 60 and the bar 64 release the teeth 26 and the segment 30 with bar 18 thereon, is returned to the shelves 74. The finished product can thereupon be removed with ease since the arms 72 engage the panels 22 (Fig. 3) of segment 28 holding the bight 12 and legs 14 and 16 in place upon the segment 28. Another sheet of material 10 is thereupon inserted through the steps above enumerated.

The modified form of my invention illustrated in Figs. 5 to 8 inclusive, includes a U-shaped segment 100 and an elongated, separable segment 102 that interlocks with the free ends of the legs of segment 100 through the medium of conventional lap joints 104. The four sides of the segments 100—102 are each provided upon the uppermost face thereof with an elongated block 106, notched as at 108 to accommodate housings 68.

Blocks 106 are swingably secured to the corresponding segments 100 and 102 by means of hinges 110. Each block 106 is provided with a plurality of locking elements broadly designated by the numeral 112.

Elements 112 include a standard 114 rigidly secured to the corresponding segments 100—102. Each standard 114 has an elongated arm 116 pivotally secured thereto as at 118, the outermost end of each arm 116 being provided with an adjustable, laterally extending screw element 120.

A bifurcated handle 122 is pivotally secured to the standard 114 as at 124 in embracing relationship to standard 114. Arm 116 and handle 122 are pivotally interconnected by means of links 126. An elongated plate 128 for receiving each screw 120 respectively, is provided on the corresponding blocks 106. The supporting framework for the sheet 10 of material, as well as the finished molded product, is received by the segments 100—102 when the arms 116 and handles 122 are swung to the position illustrated in Fig. 7 of the drawing and when the blocks 106 are swung as illustrated in Fig. 5. After the framework is thus in place, the blocks 106 are swung to the position shown in Fig. 7 in overlapping relationship to the corresponding panels 22 and all of the arms 116 are swung on pivot point 118 to move screw elements 120 against the corresponding plates 128.

Swinging of the handles 122 to the position illustrated in Fig. 8 of the drawings, thereupon forces the blocks 106 against the panels 22 against the action of springs 70 thereby opening the teeth 26. The off-center action of the links 126 causes the arms 116 and the screw elements 120 thereon to lock the blocks 106 in the position shown in Fig. 8, where panels 22 are held in the open position.

In this form of the invention, it is seen that segment 102 is removable from the segment 100 while the frame member 18 is clamped thereon, in the same manner as above described with respect to the first form herein set forth.

Having thus described the invention, what is claimed as new and desired to be secured by Letters Patent is:

1. Handling apparatus for a frame separate from the apparatus and having a plurality of sections each provided with releasable elements shiftably mounted thereon for holding a sheet of stock material adjacent its peripheral edges during molding thereof, said apparatus comprising a support for receiving said frame; and means on said support separate from said elements and shiftable to a position engaging said elements when the frame is on the support to shift said elements to one end of their paths of travel and thereby release the same, said support having a segment for each section respectively, each segment with its section thereon being separable from remaining segments, said structure being adapted to clamp the sections of the frame to corresponding segments of the support.

2. Handling apparatus for a centrally open frame separate from the apparatus and having a plurality of separable sections each adapted to support a peripheral portion of a sheet of initially substantially rigid stock material and provided with a number of swingable clamping elements each hingedly mounted on its section for movement between a normal position engaging the sheet and a released position out of engagement with the sheet, said apparatus comprising a centrally open support for receiving said frame with said central openings of the frame and the support disposed in alignment to expose a central portion of the sheet for molding thereof without removal of the sheet from the frame, said support having a plurality of segments respectively corresponding to and adapted to support the sections of the frame, each segment with its corresponding section thereon being separable from another segment and its section; and means on the support and including a shiftable member for each element respectively but separate therefrom, each of said members being mounted on the support for shifting movement to and from a position engaging a corresponding element when the frame is on the support to swing said element to one end of its path of travel and into said released position.

3. Handling apparatus for a centrally open, rectangular frame separate from the apparatus and having a pair of separable sections including a U-shaped section and a straight, elongated section, each section being adapted to support a peripheral portion of a sheet of intially flat, rectangular and substantially rigid stock material and provided with a number of swingable clamping elements, each element being hingedly mounted on its section intermediate a pair of its opposed margins for rocking movement between a normal position to which it is yieldably biased with a part of the element adjacent one of said margins thereof in clamping engagement with said portion of the sheet for holding the portion against the section and the sheet within the frame during heating and molding of the sheet and a released position moving the element out of engagement with the sheet after molding and rehardening of the sheet, said apparatus comprising a centrally open, rectangular support for receiving said frame with said central openings of the frame and the support disposed in alignment to render a central portion of the sheet accessible to a molding device without removal of the sheet from the frame or the frame from the support, said support having a U-shaped segment and a straight, elongated segment respectively corresponding to and adapted to support the U-shaped section and the straight section of the frame, each segment with its corresponding section thereon being separable from the other segment and its section; and means on the support and including a reciprocable member for each element respectively but separate therefrom, each of said members being mounted on the support for reciprocable movement toward and away from the support and the frame when the latter is on the support and between a sheet-holding position disposing the member for clearing its corresponding element and a sheet-releasing position disposing the member for operative engagement with a second part of its corresponding element adjacent the other of said margins of the element for rocking the element to move said one part thereof away from the support and out of clamping engagement with the sheet.

4. In the apparatus as set forth in claim 3, wherein said members are adapted to clamp the sections of the frame to corresponding segments of the support, when the members are in said sheet-releasing position.

References Cited in the file of this patent

UNITED STATES PATENTS

| | | |
|---|---|---|
| 1,746,267 | Kuhne et al. | Feb. 11, 1930 |
| 1,754,575 | Scharpf | Apr. 15, 1930 |
| 1,853,130 | Leopold, Jr. | Apr. 12, 1932 |
| 2,102,552 | Campbell | Dec. 14, 1937 |
| 2,421,698 | Hordes | June 3, 1947 |